United States Patent [19]

Serizawa et al.

[11] Patent Number: 4,644,415
[45] Date of Patent: Feb. 17, 1987

[54] MAGNETIC VIDEO RECORDING AND REPRODUCING APPARATUS

[75] Inventors: Yoshinori Serizawa; Masaharu Hayakawa, both of Nagaokakyo, Japan

[73] Assignee: Mitsubishi Denki Kabushiki Kaisha, Tokyo, Japan

[21] Appl. No.: 736,752

[22] Filed: May 21, 1985

[30] Foreign Application Priority Data

Jun. 7, 1984 [JP] Japan .................................. 59-117759

[51] Int. Cl.$^4$ ........................ H04N 5/78; H04N 9/491
[52] U.S. Cl. .................................. 360/10.3; 358/312; 358/314; 360/38.1
[58] Field of Search ............................ 360/10.3, 38.1; 358/336, 312, 314

[56] References Cited

U.S. PATENT DOCUMENTS 4,463,390 7/1984 Koga et al. ........................ 360/10.3

FOREIGN PATENT DOCUMENTS 55-53982 4/1980 Japan .................................. 360/10.3

Primary Examiner—Aristotelis M. Psitos
Attorney, Agent, or Firm—Lowe Price LeBlanc Becker & Shur

[57] ABSTRACT

A tape travelling drive circuit (25) of a magnetic video recording and reproducing apparatus enables a magnetic tape (1) to travel at a speed approximate to a value $\{2n\pm(1/m)\}$ times the travelling speed for recording (n being a positive integer and m being a positive integer excluding 1). A detector (34) detects an output level of a reproduced video signal. If the output level is higher than a predetermined level, the detector (34) stores the reproduced video signal in a storage circuit (35) for a specified period and at the same time provides the signal through a selector (32). If the output level is lower than the predetermined level, the reproduced video signal stored in the storage circuit (35) is read out and provided through the selector (32). Thus, even if the output level is lowered, a picture of good quality with little noise can be reproduced.

2 Claims, 5 Drawing Figures

MAGNETIC VIDEO RECORDING AND REPRODUCING APPARATUS

BACKGROUND OF THE INVENTION

1. Field of the Invention

The present invention relates to a magnetic video recording and reproducing apparatus. More particularly, the present invention relates to a magnetic video recording and reproducing apparatus having a recording mode, a standard reproducing mode and a high-speed reproducing mode, in which noise can be decreased at the time of high-speed reproduction.

2. Description of the Prior Art

As is well known, a magnetic video recording and reproducing apparatus (hereinafter referred to as a VTR) is generally used to record a video signal in a magnetic tape or to reproduce a video signal recorded in a magnetic tape.

FIG. 1 is a view showing a video recording portion of a conventional VTR and a magnetic tape where a video signal is recorded. In FIG. 1, the video recording portion 10 comprises a head drum 11 provided rotatably in a position where the magnetic tape 1 travels. In the head drum 11, magnetic heads 12 and 13 for recording or reproducing a video signal are positioned to be distant from each other by a certain angle (180° in the figure). The magnetic tape 1 having one end wound to a feed reel 14 and the other end wound to a take-up reel 15 is set obliquely around the head drum 11. In the vicinity of the take-up reel 15, a capstan 16 and a pinch roller 16 are provided so that the magnetic tape 1 inserted therebetween is made to move by friction.

In a VTR of VHS system, the longitudinal direction of the magnetic tape 1 is given in a relation in which the magnetic tape 1 is slanted downward on the right side and upward on the left side with respect to the head drum 11. As a result, the record pattern of a video signal recorded in the magnetic tape 1 is as shown in the upper portion in FIG. 1. In the VHS system, the A track 2 where recording has been done is recorded with an azimuth of 6° and the B track 3 where recording is being done is recorded with an azimuth of −6°. In the figure, the direction of arrow x indicates the travelling direction of the magnetic tape 1 and the direction of arrow y indicates the scanning direction of the magnetic heads 12 and 13.

FIG. 2 is a block diagram of a conventional VTR. In FIG. 2, the conventional VTR comprises a recording system block 21, a head selection switch 22, a rotary transformer 23, a reproducing system block 24, a tape travelling drive circuit 25 and a mode selection switch 26. The recording system block 21 comprises a video signal source 211, a luminance signal filter 212, a color signal filter 213, a frequency modulator 214, an adder 215 and a low frequency converter 216.

The reproducing system block 24 comprises head amplifiers 241 and 242, an adder 243, an FM video signal filter 244, an FM demodulator 245, a low frequency color signal filter 246, a high frequency converter 247, an adder circuit 248, an output terminal 249, a delay circuit 31, a selector 32 and a detector 34. The mode selection switch 26 comprises a record instructing switch 261, a reproduction instructing switch 262, a stop instructing switch 263, a high-speed reproduction instructing switch 264 and a temporary stop instructing switch 265.

FIG. 3 is an illustration showing a relation between the record pattern of a magnetic tape and loci of magnetic heads at the time of high-speed reproduction at a speed four times the tape travelling speed for recording.

Now, referring to FIG. 1 to 3, the operation of the conventional VTR will be described.

First, signal processing in the recording mode will be described. In the recording mode, the switches 221 and 222 included in the head selection switch 22 are turned to the contact a side. A video signal provided from the video signal source 211 comprises a luminance signal of approximately 3 MHz at most and a color signal of 3.58 MHz. The luminance signal passes through the luminance signal filter 212 to be supplied to the frequency modulator 214. The frequency modulator 214 converts the luminance signal of 3.4 MHz to an FM signal of 4.4 MHz, which is supplied to the adder 215.

On the other hand, the color signal passes through the color signal filter 213 to be supplied to the low frequency converter 216. The low frequency converter 216 converts the color signal to a signal of 629 kHz, which is supplied to the adder 215. The adder 215 adds the frequency modulated luminance signal and the low frequency converted color signal. A signal obtained by the addition (namely, a frequency modulated video signal) is supplied to the magnetic head 12 through the switch 221 in the head selection switch 22 and the transformer 231 in the rotary transformer 23 as well as to the magnetic head 13 through the switch 222 and the transformer 232. The magnetic head 12 on one side records the modulated video signal (including the luminance signal and the color signal) on the A track 2. The magnetic head 13 on the other side records the modulated video signal (including the luminance signal and the color signal) on the B track 3.

Now, signal processing in the reproduction mode will be described in the following. In this case, the reproduction instructing switch 262 is pressed. The tape travelling drive circuit 25 turns the switches 221 and 222 included in the head selection switch 22 to the contact b side so that the reproduction system is selected. In this state, the video signal recorded on the A track 2 of the magnetic tape 1 is selected according to the azimuth and is reproduced by the magnetic head 12, so that the reproduced video signal is supplied to the head amplifier 241 through the transformer 231 and the switch 221. The head amplifier 241 amplifies the reproduced signal and the amplified reproduced signal is supplied to the adder 243. In the same manner, the video signal recorded on the B track 3 of the magnetic tape 1 is reproduced by the magnetic head 13 and the reproduced video signal is supplied to the head amplifier 242 through the transformer 232 and the switch 222.

The head amplifier 242 amplifies the reproduced signal and the amplified reproduced signal is supplied to the adder 243. The adder 243 adds both of the reproduced signals of the A track 2 and the B track 3 and the signal obtained by the addition is supplied to the FM video signal filter 244 and the low frequency color signal filter 246. The FM video signal filter 244 passes therethrough the FM video signal having the frequency modulated by the above stated frequency modulator 214, so that the FM video signal is supplied to the FM demodulator 245. The FM demodulator 245 demodulates the FM video signal to provide the luminance signal, which is supplied to the adder 248.

On the other hand, the low frequency color signal filter 246 passes therethrough the color signal having the low frequency converted by the above stated low frequency converter 216, so that the low frequency color signal is supplied to the high frequency converter 247. The high frequency converter 247 converts the low frequency color signal to a color signal having high frequency of 3.58 MHz, which is supplied to the adder 248. The adder 248 adds the demodulated luminance signal and the high frequency converted color signal, so that the signal obtained by the addition is supplied to the output terminal 249 through the selector 32 as a reproduced composite video signal.

In the case of high-speed reproduction, the high-speed reproduction instructing switch 264 is pressed and a signal responsive thereto is supplied to the detector 34. At the same time, the tape travelling drive circuit 25 enables the capstan 16 to rotate at a speed approximate to an even-numbered multiple of the rotating speed for recording. The reproduced composite video signal from the adder 248 is supplied directly to the selector 32 and is also supplied to the selector 32 with a delay by the delay circuit 31. The output of the adder 243 is supplied to the detector 34. The detector 34 detects the output level of the adder 243 in response to the signal from the high-speed reproduction instructing switch 264 and provides a signal for turning the selector 32 to the proper side. When an output of the adder 243 higher than a predetermined level is detected, the selector 32 is turned to the contact a side so that the reproduced composite video signal is provided to the output terminal 249. When an output of the adder 243 lower than the predetermined level is detected, the selector 32 is turned to the contact b side so that the delayed reproduced composite video signal is provided to the output terminal 249.

More specifically, in order to decrease noise on the screen at the time of high-speed reproduction, a reproduced composite video signal having noise is replaced by a reproduced composite video signal one field ahead of it, which is based on the fact that the contents to be represented on the screen in the adjacent one or two fields are almost the same at the time of high-speed reproduction. However, if noise is also contained in the reproduced composite video signal one field ahead, noise on the screen cannot be decreased by the above stated replacement. For example, if a video signal is recorded in the magnetic tape 1 using magnetic heads each having a width smaller than ½ of a track pitch, a relation as shown in FIG. 3 is obtained between the record pattern of the magnetic tape 1 and the loci of the magnetic heads at the time of high-speed reproduction of the magnetic tape 1 with a speed four times the tape travelling speed for recording, and as a result, noise always appears in the portions N of the screen region. The portions P in FIG. 3 are the portions where the composite video signal is reproduced in the screen region 4.

Thus, the conventional VTR has the above stated structure, which involves disadvantages that in the case of high-speed reproduction of a video signal, if the width of the respective magnetic heads is smaller than ½ of a track pitch for recording, the lowered outputs of the magnetic heads 12 and 13 exist in synchronism within one or two fields, causing noise in fixed positions on the screen instead of decreasing noise on the screen.

SUMMARY OF THE INVENTION

Therefore, a principal object of the present invention is to provide a magnetic video recording and reproducing apparatus in which noise can be decreased at the time of high-speed reproduction and a picture of good quality can be obtained.

To briefly state the present invention, high-speed reproduction is performed at a speed approximate to a value $\{2n\pm(1/m)\}$ times the tape travelling speed for recording (n being a positive integer and m being a positive integer excluding 1) and a level of an information signal reproduced at this time is detected, so that the reproduced information signal having a level higher than a predetermined level is stored in a predetermined period and that the reproduced information signal having a level lower than the predetermined level is replaced by the above stated stored reproduced information signal, which is provided as output.

Thus, according to the present invention, if the level of a reproduced information signal is lowered at the time of high-speed reproduction, a reproduced information signal stored before the lowering of the level can be supplied, which makes it possible to remove noise on the screen and to obtain a picture of good quality.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
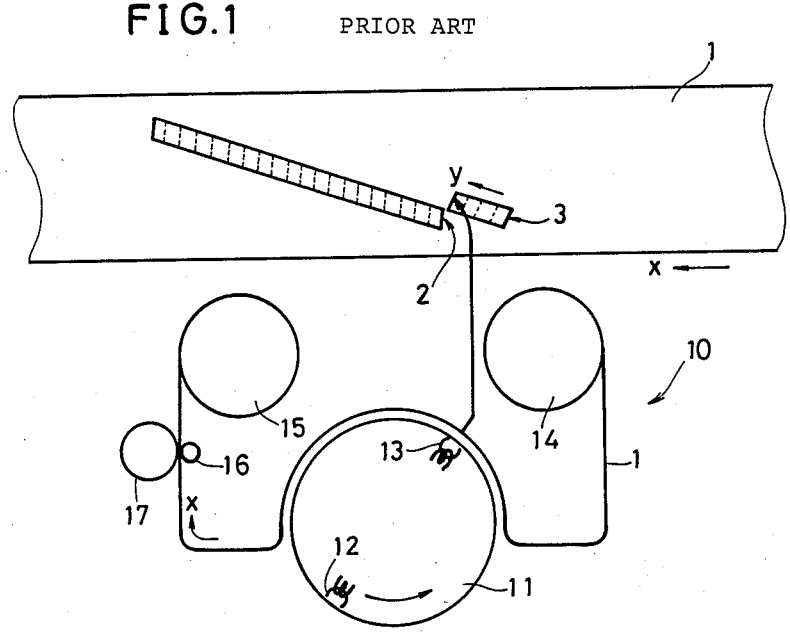
FIG. 1 is a view showing a video recording portion of a conventional VTR and a magnetic tape where a video signal is recorded.
Figure 2:
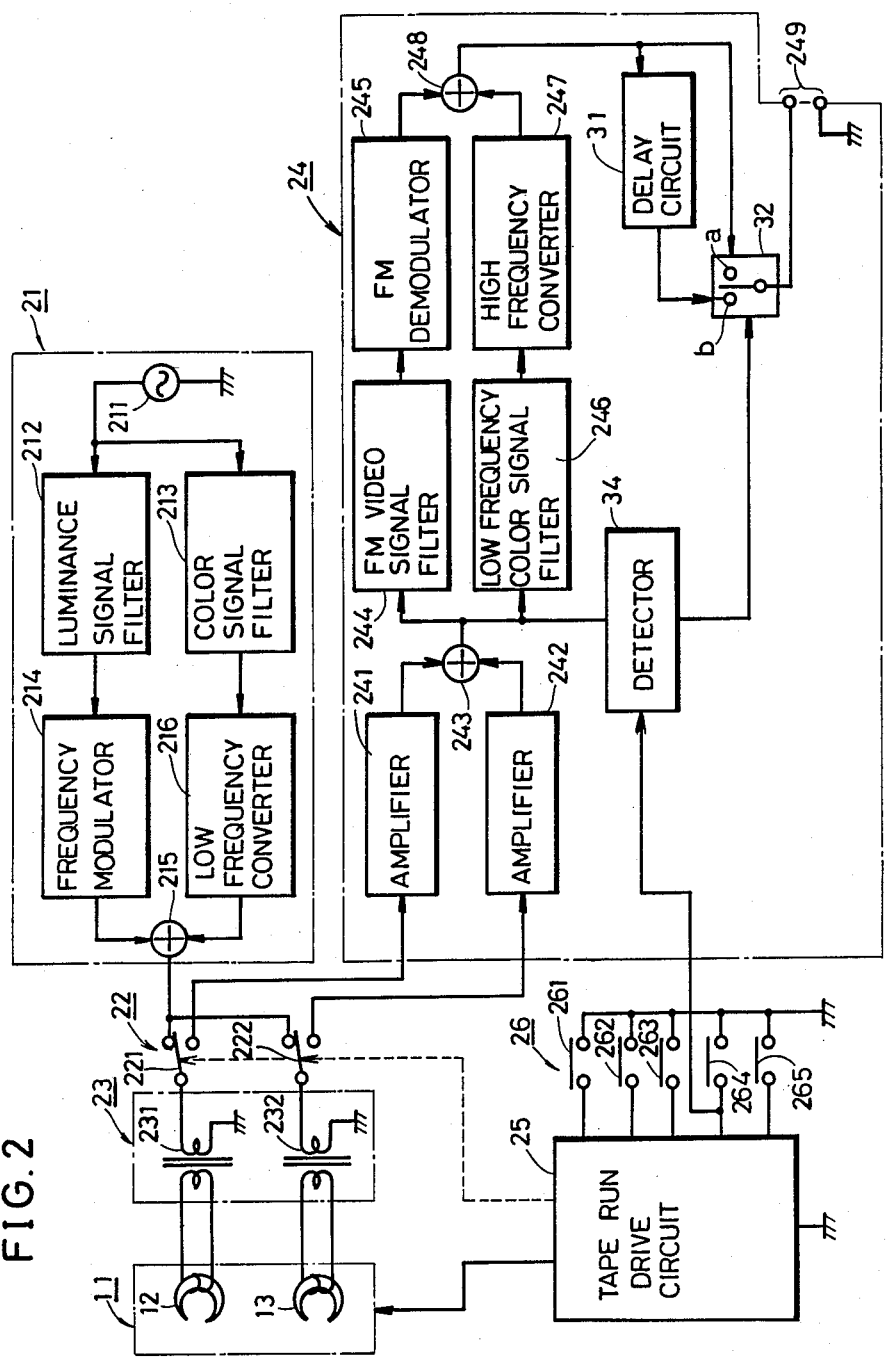
FIG. 2 is a schematic block diagram of a conventional VTR.
Figure 3:
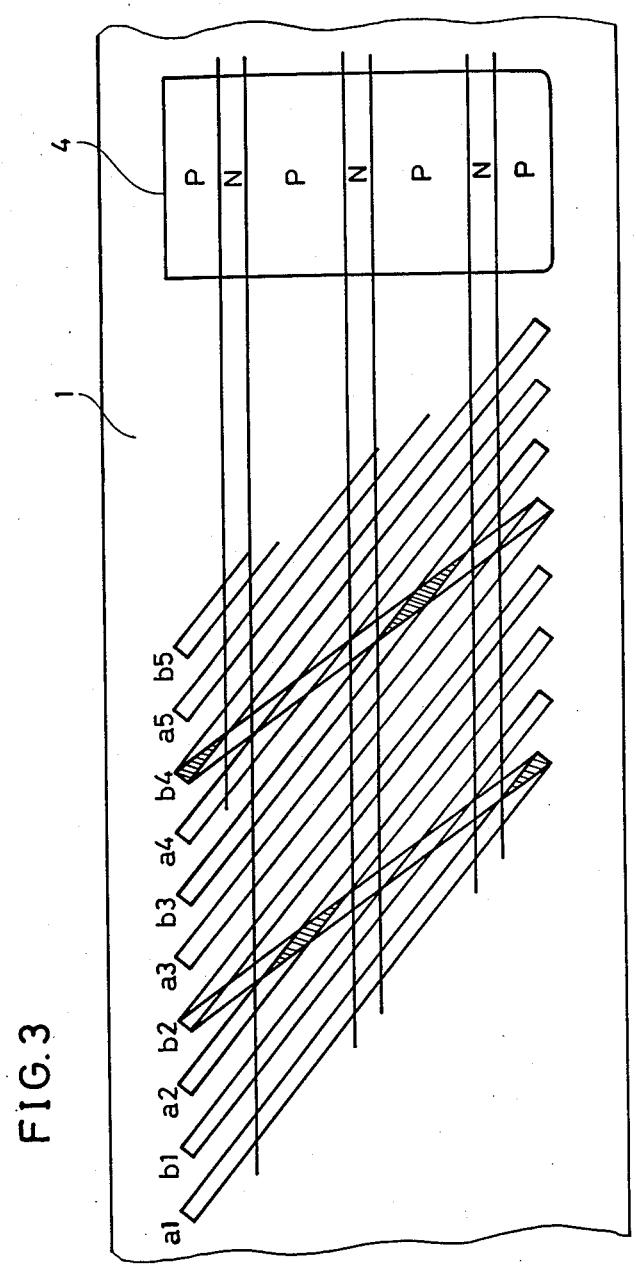
FIG. 3 is an illustration showing a relation between the record pattern of a magnetic tape and loci of magnetic heads at the time of high-speed reproduction with a speed four times the tape travelling speed for recording.
Figure 4:
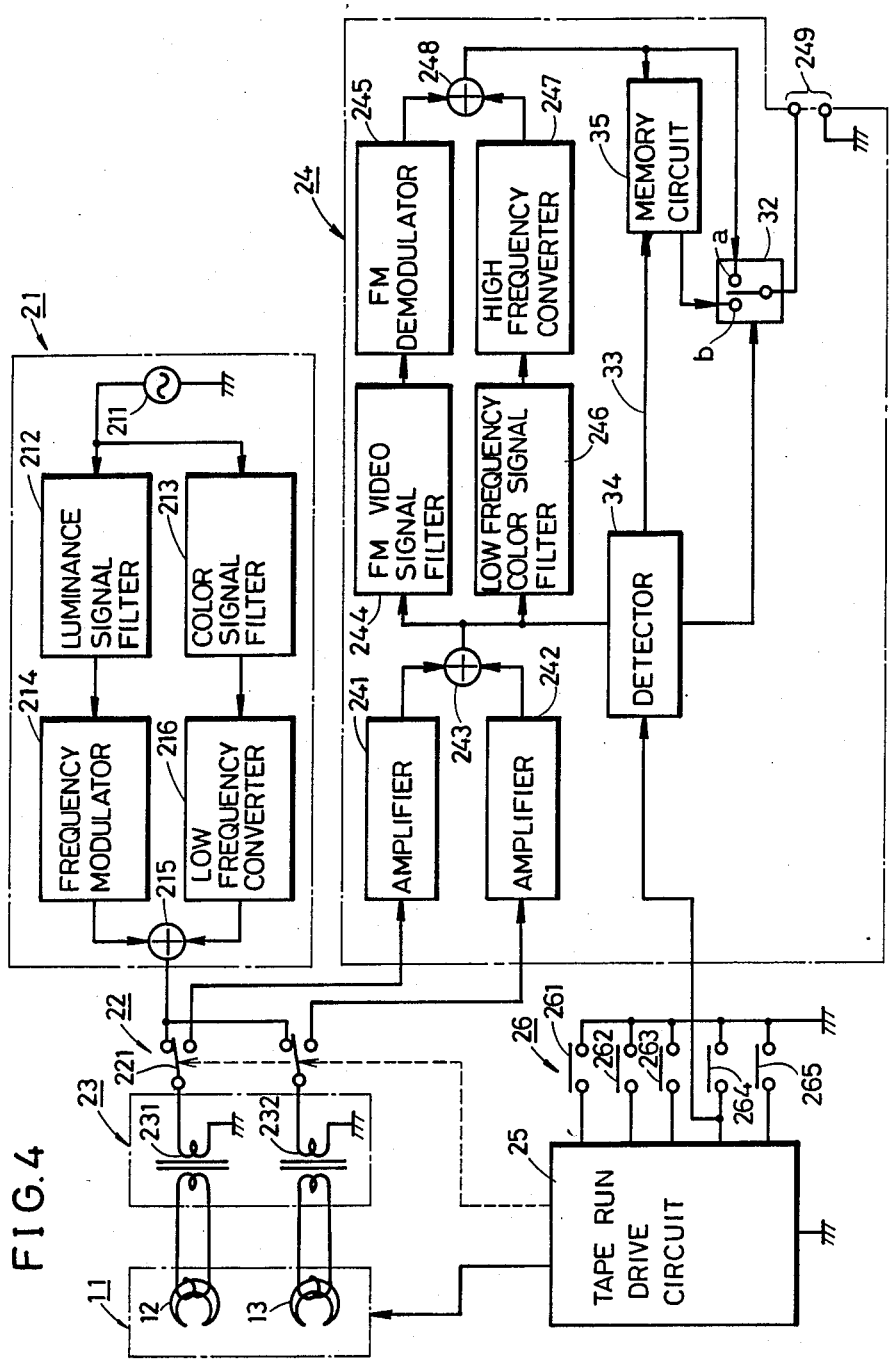
FIG. 4 is a schematic block diagram of an embodiment of the present invention.

FIG. 4 is a schematic block diagram of a VTR in accordance with an embodiment of the present invention. This block diagram in FIG. 4 differs from the block diagram of the conventional VTR in FIG. 2 in the following points. The delay circuit 31 is removed and a storage circuit 35 is provided. The adder 248 is connected to the selector 32 through the storage circuit 35. The detector 34 is connected to the storage circuit 35.

In the following, high-speed reproduction operation of this apparatus will be described. For high-speed reproduction, the high-speed reproduction instructing switch 264 is pressed to rotate the capstan 16 at high speed. A reproduced composite video signal from the adder 248 is supplied to the selector 32 as well as to the storage circuit 35. The detector 34 is responsive to the signal from the high-speed reproduction instructing switch 264 to detect an output level of the adder 243. When an output of the adder 243 higher than a predetermined level is detected, the detector 34 provides a storage signal 33 for storing the reproduced composite video signal in the storage circuit 35. The storage circuit 35 is responsive to the storage signal 33 to store the reproduced composite video signal. At this time, the selector 32 is turned to the contact a side so that the reproduced composite video signal is provided directly to the output terminal 249. When an output of the adder 243 lower than the predetermined level is detected, the selector 32 is turned to the contact b side so that the reproduced composite video signal stored in the storage circuit 35 is provided to the output terminal 249. Thus, a part of the noiseless reproduced composite video signal is always stored in the storage circuit 35, and the selector 32 makes selection between the output of the storage circuit 35 and a reproduced composite video signal containing noise, which makes it possible to remove noise in the composite video signal provided to the output terminal 249, resulting in no noise on the screen at the time of reproduction.

Now, the high-speed reproduction operation will be described in more detail in connection with the magnetic tape travelling speed. As described previously, if the tape travelling speed for high-speed reproduction is an integer multiple of the tape travelling speed for recording, the reproduced composite video signal stored in the storage circuit 35 by the storage signal 33 is represented fixedly in the same portion on the screen, causing noise in the picture. However, if the tape travelling speed for high-speed reproduction is a specified integer multiple of the tape travelling speed for recording, as described below, noise in the picture can be completely removed.

Figure 5:
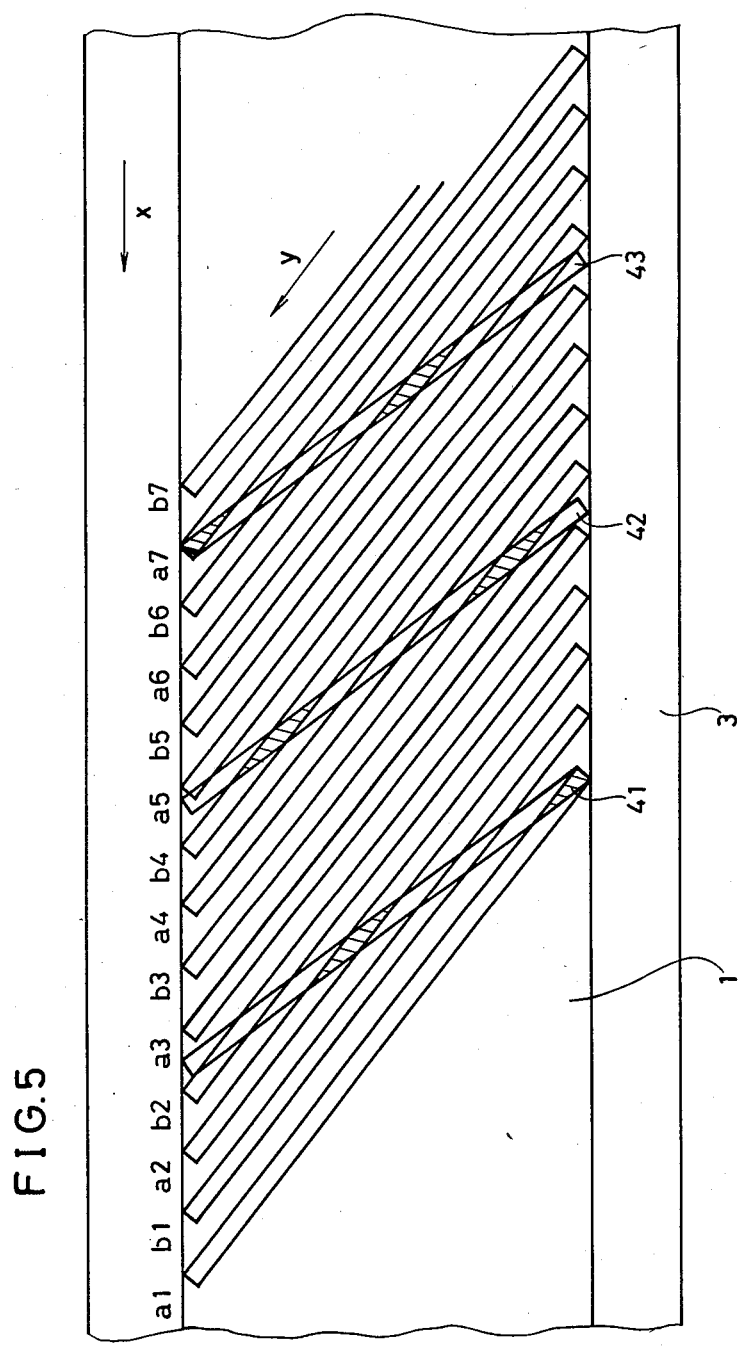
FIG. 5 is an illustration showing a relation between the record pattern of a magnetic tape and loci of magnetic heads at the time of high-speed reproduction with a speed 4·(½) times the tape travelling speed for recording in accordance with an embodiment of the present invention.

FIG. 5 is an illustration showing the record pattern of the magnetic tape and loci of the magnetic heads at the time of high-speed reproduction with a tape travelling speed 4·($\frac{1}{3}$) times as much as the tape travelling speed for recording in the case where the width of the respective magnetic heads is smaller than $\frac{1}{3}$ of a track pitch. In FIG. 5, the direction of arrow x indicates the travelling direction of the magnetic tape 1 and the direction of arrow y indicates the scanning direction of the magnetic heads 12 and 13. The reference numerals 41 and 43 indicate loci of the magnetic head 12 and the reference numeral 42 indicates a locus of the magnetic head 13. The magnetic heads 12 and 13 respectively reproduce video signals recorded on the tracks having the equal azimuth and thus, the hatched portions in the figure are reproduced. Accordingly, when the magnetic head 12 moves from the A track a1 to the A track a2 or when the head locus on the A track a1 comes to an end, noise appears in the reproduced composite video signal. On the other hand, since a vertical synchronizing signal is recorded on a control track 3 in the lowermost end of the magnetic tape 1, noise appears on the screen in the vicinity of the upper $\frac{1}{3}$ point and in the lowermost end. As for the magnetic head 13, the locus 42 starts from a position distant from the lower end of the A track a3 by $\frac{1}{3}$. Accordingly, as can be seen from FIG. 5, noise appears in different positions from those in the case of the magnetic head 12, namely, in the uppermost end, nearly in the center and in the lowermost end on the screen. Further, in the subsequent locus 43 of the magnetic head 12, noise appears in the uppermost end and in the vicinity of the lower $\frac{1}{3}$ point on the screen.

When a reproduced composite video signal is being obtained by the output of the magnetic head 12 along the locus 43, a reproduced composite video signal obtained by the addition of a signal component from the head locus 41 by the magnetic head 12 and a signal component from the head locus 42 by the magnetic head 13 is stored in the storage circuit 35. Accordingly, when the output of the magnetic head 12 is lowered at the time of reproduction along the head locus 43, the selector 32 is turned to the proper side to provide the noiseless composite video signal stored in the storage circuit 35 to the output terminal 249 and thus, a noiseless picture can be obtained by the high-speed reproduction. It is the same with the case of reproduction by the magnetic head 13.

The tape travelling speed for high-speed reproduction is not limited to the speed 4·($\frac{1}{3}$) times the tape travelling speed for recording. It may be a speed approximate to a value $\{2n\pm(\frac{1}{3})\}$ times the tape travelling speed for recording (n being a positive integer), and thus, if the reproduced composite video signal contains noise, a noiseless reproduced composite video signal can be provided to the output terminal 249 as can be understood from the drawing. It can also be understood from the drawing that if the tape travelling speed for high-speed reproduction is in the vicinity of a value $\{2n\pm(\frac{1}{3})\}$ times or $\{2n\pm(1/5)\}$ times the tape travelling speed for recording (n being a positive integer), a noiseless reproduced composite video signal can be provided to the output terminal 249.

Thus, if the magnetic tape 1 travels at a speed almost equal to a value $\{2n\pm(\frac{1}{3})\}$ times the tape travelling speed for recording (n being a positive integer), when the magnetic head 12 passes on the B track or when the magnetic head 13 passes on the A track, an output of the storage circuit 35 is provided to the output terminal 249 if the output of the adder 248 becomes lower than the predetermined level. More specifically, since the contents to be represented on the screen are almost the same for adjacent one or two fields, if a reproduced composite video signal contains noise, this signal is replaced by a reproduced composite video signal one or two fields ahead of it so that noise can be decreased on the screen. If the reproduced composite video signal one or two fields ahead also contains noise, noise will not be decreased on the screen even by this replacement. However, since there is little probability that such noise will exist in synchronism within a distance of one or two fields, noise will appear on the screen with considerably decreased frequency.

Although in the above described embodiment, the output of the adder 243 is supplied to the detector 34, the output of the FM video signal filter 244 or the output of the rotary transformer 23 may be supplied to the detector 34.

In addition, as the storage circuit 35 for storing the composite video signal in the above described embodiment, a semiconductor memory can be used. In this case, the reproduced composite video signal undergoes A/D conversion so that a digital signal is stored in the semiconductor memory, and after an arbitrary number of fields, the stored content undergoes D/A conversion to be provided as output. The semiconductor memory has characteristics that the stored content can be partially reproduced or rewritten by designating addresses and that the stored content can be reproduced as many times as required until the subsequent signal is written. Therefore, if a semiconductor memory is used in the above described embodiment, a reproduced video signal can be replaced by another reproduced video signal an arbitrary number of fields ahead of it.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic video recording and reproducing apparatus provided with rotating heads, in which a recording mode, a standard reproduction mode and a high-speed reproduction mode are applied, said magnetic video recording and reproducing apparatus comprising:

travelling drive means (25) for enabling a magnetic tape to travel in said high-speed reproduction mode at a speed approximate to a value $\{2n\pm(1/m)\}$ times the travelling speed in said recording mode (n being a positive integer and m being a positive integer excluding 1), level detecting means (34) for detecting a level of an information signal reproduced by said rotating magnetic heads, storage means (35) for storing for a predetermined period said information signal reproduced in said high-speed reproduction mode, in response to said level detecting means detecting a level of said information signal higher than a predetermined level, and selection means for providing said information signal reproduced in said high-speed reproduction mode in response to said level detecting means detecting a level of said information signal higher than said predetermined level and for providing said information signal stored in said storage means in response to said level detecting means detecting a level of said information signal lower than said predetermined level.

2. A magnetic video recording and reproducing apparatus in accordance with claim 1, wherein said rotating magnetic heads each have a width smaller than ½ of a track pitch in said recording mode.

* * * * *